Patented Oct. 29, 1935

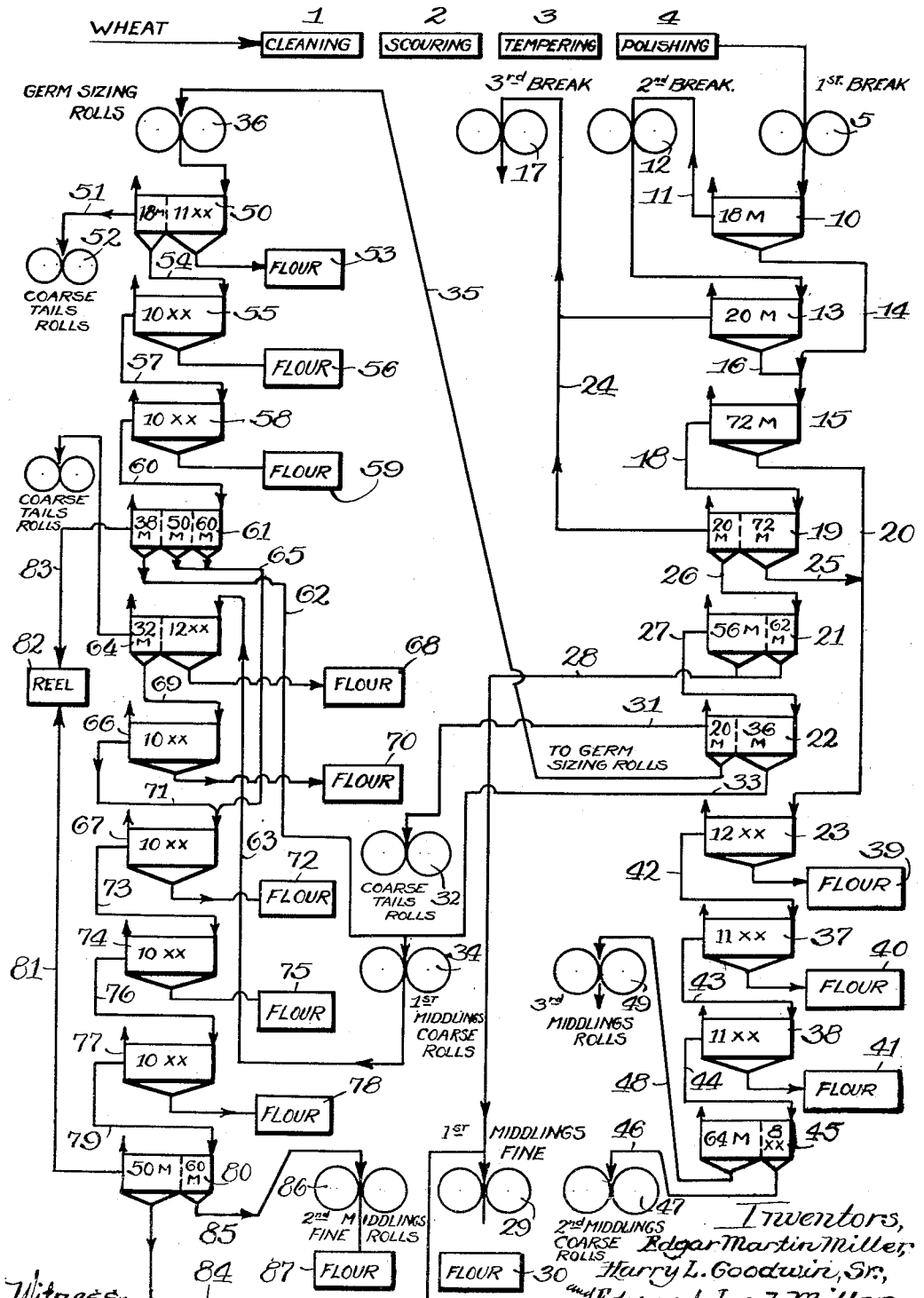

2,018,966

UNITED STATES PATENT OFFICE 2,018,966

MANUFACTURE OF WHEAT FLOUR

Edward Jacob Miller, Clinton, Mo., Harry L. Goodwin, Sr., Chicago, Ill., and Edgar Martin Miller, Clinton, Mo.

Application November 25, 1932, Serial No. 644,224

4 Claims. (Cl. 83—42)

The present invention relates to the manufacture of flour from wheat, and is directed to the process and the product.

Flour in general consists of the starchy portion of wheat berries and some gluten. Considering the numerous distinctive parts and materials of natural wheat berries, it is a matter of great concern how the same are treated to make flour. In order best to explain the invention and its improvements over the prior art, a description of the wheat berry is given.

A wheat berry has fibers attached to it known as the beard. The berry itself comprises a husk, which provides "bran". The center of the berry is the endosperm or starch kernel. Adjacent the husk and around the endosperm there is a layer of glutinous material. In the husk and gluten layers are various mineral-containing substances. At one end of the berry there is the "germ" which is rich in oil and vitamins. Running through the berry is a channel filled with dirt. The channel originally provided nutriment to the growing berry, and the dirt accumulating therein is the "ergotty" impurity which is of poisonous nature and very undesirable. In addition to these component materials there is external non-component dirt which is mechanically caught in the crease of the berry. This may include dirt blowing in the air over the growing fields, and other mechanical accumulations or deposits.

It is the object of milling to prepare flour with a minimum of undesirable impurities, and a maximum of starch, gluten and other constituents. The nature of what is desirable or undesirable has varied in past years, and now varies for different purposes, and in different mills. Particular milling operations often necessitate removing something which is desirable.

The germ for instance has been a source of conflicting desires. It is wanted for its fat and vitamin content. It is undesirable because it rancidifies. Many mills have been so operated that it has been isolated. Some who have returned it to the flour have subjected it to heat, as by roasting or steaming, to destroy its rancidifying property. By so doing they have destroyed some or all of the vitamin content, and have cooked the germ.

The present invention is concerned with a process of milling which has particular merit for the germ. It also more effectively removes bran, dirt and other filth; provides a higher percentage of first grade flour; provides a high content of mineral and gluten constituents; provides a whiter flour; all with the inclusion of the oily germ substance in uncooked form, and vitamins of the germ, without any tendency to rancidify. The flour product so made is drier and more granular, and has superior qualities in bread-making.

A particular object of the invention is the use of a mild current of air in refining or bolting the stock in process; the subjection of the flour-forming stock and the wheat germ to the action of air; and the use of the air in such a way that it purifies the stock and germ of filth, dirt, and bran, while exerting its beneficial action on the stock and germ.

Another object of the invention is the treatment of the germ with air to convert it from an originally oily or gummy plastic body into a hard set granular body capable of granulation for admixture with flour.

Various other and ancillary objects and advantages of the invention will be apparent from the following description and explanation of the invention as hereinafter appears in reference to the accompanying drawing.

The drawing represents diagrammatically various steps in the process from the wheat berries to finished flour.

The present invention as it is herein specifically illustrated involves the inventions of the Smith Patents Nos. 1,154,547 and 1,154,067. The former patent describes a process of purifying flour or flour in process of manufacture which consists in moving the impure material in a relatively thin layer and simultaneously forcing a slight draft of air uniformly throughout said moving layer, and carrying away said lighter impurities from said flour.

In prior milling processes it has been a long established practice to flatten the germ so that it could be removed or isolated. In the operation of the Smith process of air purification such a flattened germ is removable as a float by the current of air, or as a tail from a screen. A germ can be flattened to an area as large as a small finger nail.

We have found that a new result is obtained when in the Smith process we do not flatten, or remove the germ from the flour-forming stock. We have found that in the beginning the germ is soft and oily, and that by proper manipulation to keep it in the process in the flour-forming stock, it becomes set, or hard, or granular, due somehow to the prolonged action of the air upon it. At this set stage it may be broken or crumbled without flattening, and in such comminuted condition it is milled and bolted as an integral part of the flour. We have further discovered that the flour so made to incorporate the so-treated germ, is not subject to rancidity. The flour has many additional qualities distinguishing it from others, which can be explained after the process is more fully described.

In the preferred practice of the invention we have used apparatus generally like that shown in the Smith patents, but have made numerous changes in the flow of materials, and in the control of certain steps. The process employs many preliminary operations which are common in the art, but inasmuch as control of these old steps can be determined by conditions encountered in the new process, the steps are described and the controlled factors are related to the new process.

1. *Cleaning and separating.*—Raw wheat may contain from 8% to 12% moisture according to season. The wheat may be washed with water or cleansed in a dry process with dry lime. Much dust and mechanical dirt may thus be removed. The wheat may be graded as to size if desired.

2. *Scouring.*—Standard scouring procedure may be followed. It consists of mechanical rubbing of the wheat berries in suitable apparatus such as a perforated drum in which a metal agitator may knock the grains swiftly against the sides of the drum for removing fuzz or beard from the berry. The fuzz is blown away.

3. *Tempering.*—The wheat berries are treated to increase the moisture content and toughen the bran. This may be accomplished by passing the berries over a traveling conveyor with water. They are then stored in bins so that the water tempers the berry. Standard practice calls for storage over a period of 24 to 72 hours to increase the total moisture content uniformly into the interior to 14% or 15%. In the new process the tempering does not need to be so complete and it is not necessary to temper so long that the interior of the berry is made more moist. A storage time of 6 to 8 hours is suitable for the new process. A satisfactory moisture content is 14.8%±.5%, but a range from 12% to 16% is a permissible range. Control of the tempering may be effected for (1) preventing any or excessive tempering of the interior, and (2) minimizing tempering of the germ.

4. *Polishing.*—The polishing action is carried on much the same as the scouring but is more gentle. The beater or agitator employed to knock the grains about is softer, as of rubber rather than iron. The polishing removes a considerable portion of the outer husk as "bran".

5. *First breaking rolls.*—The wheat berries are subjected to the breaking rolls as in standard practice. Reference to the structure and operation is not required, as the result here obtained is known to the art. The rolls are employed to give the berries a slight break in order to release the germs in substantially the natural kernel form. On account of this desirable special result, there may be some undefinable variations in operation which any skilled workman would naturally arrive at from experience and observation.

In reference to the difference between the present and prior processes at this point, it may be stated that owing to the less or the incomplete tempering of the wheat, the germ is not so soft as in standard milling processes, and there is a lessened tendency for it to be flattened.

6. *Purifying.*—The course of material following the first break now embodies the new process, and may be understood by reference to the accompanying drawing. It is to be understood that purifying units or chambers like the Smith patents are indicated diagrammatically as blocks, representing the tilted screen, upwards through which air passes. The upward arrow from the block represents the air and impurities lifted away by it. The horizontal arrow leaving the block indicates "tails" from the screen. The downward arrow leaving the block represents material passing through the screen. The V-shaped section under the block represents the receiving chamber for screenings, and where two such are shown it corresponds to a single tray with screens of different mesh, as illustrated in the Smith patents. The simple figure within the block indicates the mesh per inch, and the figure followed by $xx$ is the standard designation of the bolting cloth.

Referring to the drawing the areas designated 1, 2, 3 and 4 represent respectively cleaning, scouring, tempering and polishing. Numeral 5 represents the first breaking rolls. The bank of screens at the right, and the bank at the left represent a purifying unit generally as described in the said Smith patents.

In the first break the germ is released and all of the broken product is subjected to screening at 10. Tails 11 go to the second break rolls 12 for further size reduction and return to second screen 13. Screenings 14 from screen 10 go to screen 15, combining with screenings 16 from screen 13. Tails from screen 13 are substantially free from germ material, and go to the third break rolls 17, from which its course is not pertinent to the invention.

Tails 18 from screen 15 go to screen 19, and screenings 20 from screen 15 skip the following screens 21 and 22 and are fed to screen 23. Tails 24 from screen 19 go to the third break rolls 17. Screen 19 has two gauges, and the finer screenings 25 join screenings 20 to enter screen 23. The coarser screenings 26 of screen 19 are fed onto screen 21 of which the tails 27 go to screen 22. The mixed screenings 28 of dual screen 21 go to the first middling rolls 29 in a form directly suitable for conversion into flour 30.

From dual screen 22 tails 31 go to the coarse tails rolls 32, from which its course is not pertinent to the invention. Screen 22 discharges its finer screenings 33 to the first middling rolls 34 from which the product enters the second purifying unit at the left of the drawing. Coarse screenings 35 from screen 22 go to the germ sizing rolls 36 which heads the second purifying unit at the left of the drawing. A large part of germ content is present in screenings 35.

The mixed screenings 20 is largely flour stock. Screens 23, 37 and 38 have bolting cloth and discharge flour respectively at 39, 40 and 41, as screenings. Screen 23 tails at 42 onto screen 37, which tails at 43 onto screen 38. Screen 38 tails at 44 onto a screen 45 which has a coarse bolting cloth section, and a coarser grit gauze screen to catch residual oversize material. Fine screenings 46 go to second middling rolls 47 from which its course is not pertinent. Coarse screenings 48 go to third middling rolls 49.

In the first unit the germ content has been concentrated either in flour at 39, 40 and 41 or in tailings 28 for flour 30, or in tailings 33 or 35 from screen 22.

Because of the prolonged subjection of the germ to air in the purification above described, it acquires a set or hardness distinct from its original soft form, as the lighter air-borne impurities are constantly reduced. The germ also has become drier, and this may in part account for loss of its softness. By its form it remains heavy, like the flour or starch and is not removed by the air. When the germ leaves the first bank of purifiers it can be broken as a granule, and is not subject to flattening. Hence the stock 29 comprising largely starch and germ is ready for size reduction. It is therefore run to the germ-size smooth rolls 30, where size is reduced for further grading or bolting to form flour. These rolls are employed to reduce the size of the hardened germ. In standard processes, at approximately the comparative point, the germ is still soft and these rolls are tightly set to flatten it. In our process the action is more gentle and crushes the set germ. In the second bank of purifiers the action of air is continued, further to remove dirt and filth particles, or dust present therein, and to harden or set any freshly exposed oily surface of the germ.

The material from smooth rolls 36 goes to dual screen 50 from which tails 51 go to suitable coarse tails rolls designated 52. Finer screenings 53 are flour. Coarser screenings 54 go to next screen 55, which discharges flour 56 and tails at 57 onto next screen 58, likewise discharging flour 59 and tailing at 60 onto triple screen 61. The coarser screenings 62 are first reduced in size for further progress in the unit, and this may be done by combining it with similar material such as tailings 33 at the first middling rolls 34. The latter discharges its product 63 onto the next screen 64.

The two finer screenings of screen 61 are combined as 65 and in progress skip the next screen 66 to fall onto screen 67. Dual screen 64 discharges flour at 68, and also screenings 69 onto screen 66. Screen 66 discharges flour 70, and tails 71 which unite with screenings 65 on the screen 67. Screen 67 discharges flour 72 and tails 73 which falls on screen 74. Screen 74 discharges flour 75, and tails at 76 onto screen 77 which discharges flour 78 and tails at 79 onto screen 80. Screen 80 has grit gauze of coarser mesh to discharge tails 81 to reel 82 which also receives tails 83 from the coarse screen 61. Material fed to reel 82 is not pertinent to the invention. The screenings from screen 80 are divided by the two sizes of screen. The coarser screenings 84 go to first middling rolls 29 for conversion to flour 30. The finer screenings 85 from screen 80 go to other means for reduction to flour, such as second middling fine rolls 86, for flour 87.

It will be understood that the entire process of the mill is not here illustrated. From the various rolls shown other classifying apparatus may be employed for various recovery operations. Likewise, it is to be understood that at any point between rolls and flour, as between 29 and 30, or 86 and 87, other purifying units or screens may be used. In order briefly to summarize the travel of the germ in the first column of screens, it is seen that part of the germ may enter flour at 38, 39, 40, or 41. That part of the germ which is too large leaves the first unit for size reduction either at first middling rolls 34, or at germ sizing rolls 36. It all appears from the second unit as flour at either 30, 53, 56, 59, 68, 70, 72, 75, 78, or 87. All these flour products may be combined to blend the product. Throughout its course as above described the germ is continuously aerated on the screens, whereby it becomes hard and granular to appear as granules in the flour. It will be understood that there can be wide variation in the mixture of wheat germ and starch at the various places indicated for flour discharge. Hence, we may have at some place a flour which is much higher, or very much lower, in germ substance than a blend of all the flour produced from a given quantity of wheat.

Just what action occurs in the process, we are not certain. The effect appears to be due to the action of the air, either physical or chemical, or both. As a theory for physical action, we suggest the possibility that some form of volatile rancidifying oil may be removed. It may be a solvent or softening oil, the removal of which leaves a harder residue. To a certain extent it is known that volatile oils can be removed from the germ by steam, and this knowledge supports the physical theory. In further support of the air-removing volatile oils we find that the solids in the air which has been employed have a rancid odor. As a theory for chemical action we suggest that oxidation may take place effecting a waxy or fatty form of the oil, similar to the setting of linseed and other drying oils. Such oxidation would readily account for loss of the property of rancidification. It would amount to preliminary rancidifying in advance and in process, and under conditions where odorous effects of rancidity are removed or do not occur. Carbon dioxide of the air may be an active ingredient in some way combining with material in the germ to prevent further rancidification, or combining with some product of oxidation, or forming some product capable of oxidation.

Although we are not able at present to explain exactly what takes place in the germ, it is to be understood that we do not intend to limit ourselves by presenting our theories in regard to it. We are convinced that oxygen is an active agent but are not able at present to state just how its action occurs. The prior art establishes the fact that germ material is subject to oxidation. In our process we employ oxidation in a new way and get new results.

Considerable observation and test has demonstrated that the product is high in mineral ingredients, gluten, fat and in vitamins. As high as 90% yield of first grade flour can be made from wheat, which flour has 2.37% fat compared to 2.5% in the original berry. The flour is not subject to worming or weeviling like ordinary flours, and it is whiter, cleaner, freer from bran, crease dirt, and ergotty impurities. In fact all these dirt and filth impurities are practically absent. These high qualities are attributable to the aeration process of purification as herein described.

The ergotty dirt, the crease dirt, and the bran or husk are all lighter in weight than the flour-base and the germ granules. Consequently these impurities are effectively removed in the many places of aeration. Undesirable spores, enzymes and weevil eggs can reside in the wheat channel with the ergotty substance, or in the crease with its dirt. The same conditions which remove the dirt also may remove such spores and the like, and any spores or enzymes attached to these dirt particles must be of necessity removed. The product being drier than ordinary flours naturally inhibits the development of micro-organisms and insects.

We believe that the high purification of the flour from such micro-organisms accounts for its non-worming and non-weeviling properties. We believe that the absence of dirt and ergotty filth provides less of certain nutrient substances for certain micro-organisms, and that the advance aeration of the germ so fixes it that there is no possibility for reaction of germ material or products derived therefrom with dirt or filth ingredients to produce bad odors ordinarily attendant to rancidification.

Although we have described the invention as a process for preparing flour directly from wheat without separating flour stock and germ, it is obvious that the presence of the flour stock does not contribute to the beneficial results as regards to the germ. We might of course vary the process in many ways consistent with the practice and/or theory herein described, and in defining the invention it is not to be understood that the flour-stock must of necessity accompany the germ.

While many patents in the prior art show that the wheat germ is subject to oxidation, and can be hardened by other processes, such as heating and subsequent cooling of the germ, either as a granule or flattened into a flake, we believe that we are the first to harden the germ at ordinary milling temperatures whereby to preserve the vitamin; the first to do this in the presence of flour stock; and the first to do it while simultaneously removing impurities from association with the germ and/or the flour stock. By our treatment the germ material in the flour is uncooked.

The flour is drier than ordinary flours, and no doubt the higher percentage of fat in the flour decreases its power to hold moisture. It has therefore a higher yield in bread-making, as tests have shown. It permits cutting of proofing time, gives a better loaf and a more tasty loaf because of the germ constituents. We believe that absence of undesirable yeast forms and enzymes may eliminate formation of contaminating products in the fermenting process, which may otherwise ordinarily occur, and this again may explain the improved flavor of the bread.

As an example of flour made by this process the following comparative analyses are given:

|  | New | Prior art No. 1 | Prior art No. 1 |
|---|---|---|---|
| Total moisture | 11.38% | 12.01% | 11.90% |
| Ash | .52% | .40% | .37% |
| Absorption | 68.  % | 58.  % | 61.  % |
| Acidity (pH) | 6.4 | 5.9 | 6.1 |
| Protein (nitrogen x 5.7) | 12.26% | 10.63% | 11.75% |
| Total fat | 2.22% | 1.55% | 1.64% |

It is of course to be understood that the above represents a blend representing all the first grade flour from the wheat, and not just a flour from one of the points of discharge.

In the accompanying claims we aim to include all the changes and modifications of the process which fall within the scope of the invention, as herein described and explained, and as defined by the appended claims.

We claim:

1. The method of making flour from wheat which consists in cracking wheat berries to release the germ, moving the impure material and the germ in a relatively thin layer and simultaneously forcing a slight draft of air uniformly through said moving layer, carrying away the air and impurities lighter than the germ and flour-forming stock, maintaining the aeration of said germ until the germ is set, and then crushing the germ and stock for the formation of flour.

2. The method of making flour from wheat which consists in cracking wheat berries to release the germ, aerating the stock containing the germ until the germ has set, and forming flour from the stock containing the set germ.

3. The method of making flour from wheat which consists in cracking the wheat to release the germ, removing impurities from the starch, gluten and germ, aerating the mixed materials whereby to set the germ into a harder form, and reducing the mixture containing the set germ to flour.

4. The method of forming flour from wheat which consists of breaking wheat berries, progressively removing dirt other than germ and flour-forming stock from the broken berries, simultaneously aerating the stock containing the germ until the germ has set, and reducing the size of the stock containing the set germ, whereby germ-containing flour can be made from said stock.

EDGAR MARTIN MILLER.
HARRY L. GOODWIN, Sr.
EDWARD JACOB MILLER.